United States Patent [19]

Chang et al.

[11] Patent Number: 5,143,876
[45] Date of Patent: Sep. 1, 1992

[54] PREPARATION OF HYDROXYL-RICH ZEOLITES

[75] Inventors: Clarence D. Chang, Princeton; Stuart D. Hellring, Trenton, both of N.J.

[73] Assignee: Mobil Oil Corporation, New York, N.Y.

[21] Appl. No.: 501,977

[22] Filed: Mar. 30, 1990

Related U.S. Application Data

[63] Continuation of Ser. No. 789,267, Oct. 18, 1985, abandoned.

[51] Int. Cl.$^5$ .............................................. B01J 29/06
[52] U.S. Cl. .............................................. 502/64; 502/60
[58] Field of Search ..................................... 502/60, 64

[56] References Cited

U.S. PATENT DOCUMENTS

| | | | |
|---|---|---|---|
| 3,404,086 | 10/1968 | Plank et al. | 208/120 |
| 3,644,200 | 2/1972 | Young | 208/120 |
| 4,257,885 | 3/1981 | Grose et al. | 210/691 |
| 4,449,900 | 4/1984 | Chang et al. | 502/71 |
| 4,478,806 | 10/1984 | Ball et al. | 423/328 |
| 4,503,023 | 3/1985 | Breck, deceased et al. | 423/328 |
| 4,524,055 | 6/1985 | Onodera et al. | 423/328 |

FOREIGN PATENT DOCUMENTS

| | | | |
|---|---|---|---|
| 0134330 | 3/1985 | European Pat. Off. | 29/28 |
| 0148626 | 7/1985 | European Pat. Off. | 29/6 |

OTHER PUBLICATIONS

Jacobs, P. A. and Roland von Ballmoos, "Framework Hydroxyl Groups of H–ZSM-5 Zeolites", *J. Phys. Chem.* 1982, 86, pp. 3050–3052.

Datka, J. and E. Tuznik, "Hydroxyl Groups and Acid Sites in Na–ZSM-5 Zeolites Studied by I. R. Spectroscopy", *Zeolites*, 1985, vol. 5, Jul. pp. 230–232.

Chu, Cynthia T-W, and Clarence D. Chang, "Isomorphous Substitution in Zeolite Frameworks. 1. Acidity of Surface Hydroyxls in [B]-, [Fe]-, [Ga]-, and [Al]-ZSM-5", *J. Phys. Chem.*, vol. 89, 1569–1571 (1985).

*Primary Examiner*—Carl F. Dees
*Attorney, Agent, or Firm*—Alexander J. McKillop; Charles J. Speciale; Marina V. Schneller

[57] ABSTRACT

Zeolites (e.g. ZSM-5 and zeolite beta) enriched with hydroxyl groups are prepared by ammonia treatment of sieves which have suffered loss of tetrahedral aluminum from framework positions followed by careful calcination (200°–450° C.). The hydroxyl group created by this method are stable only to 500° C.

28 Claims, 10 Drawing Sheets

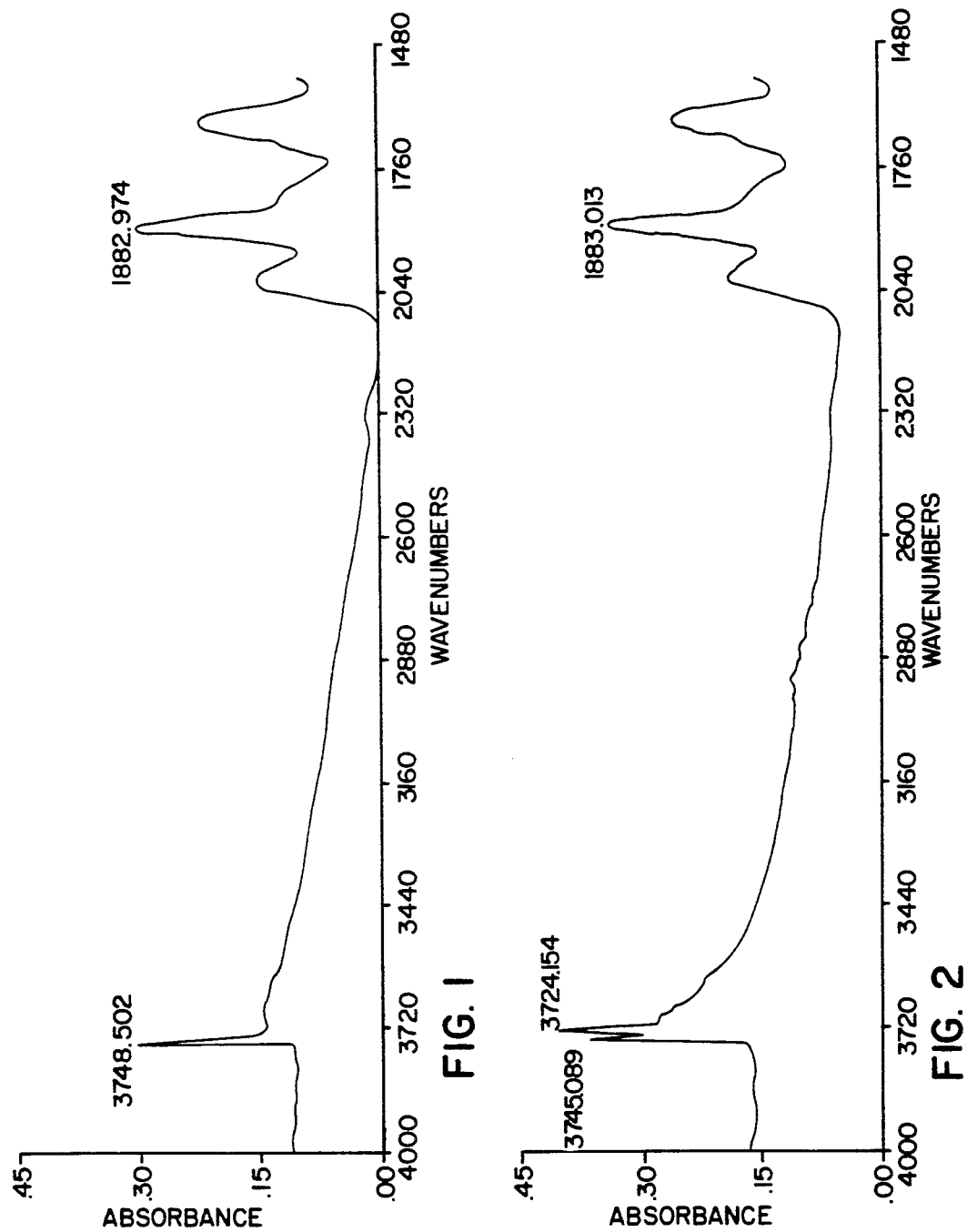

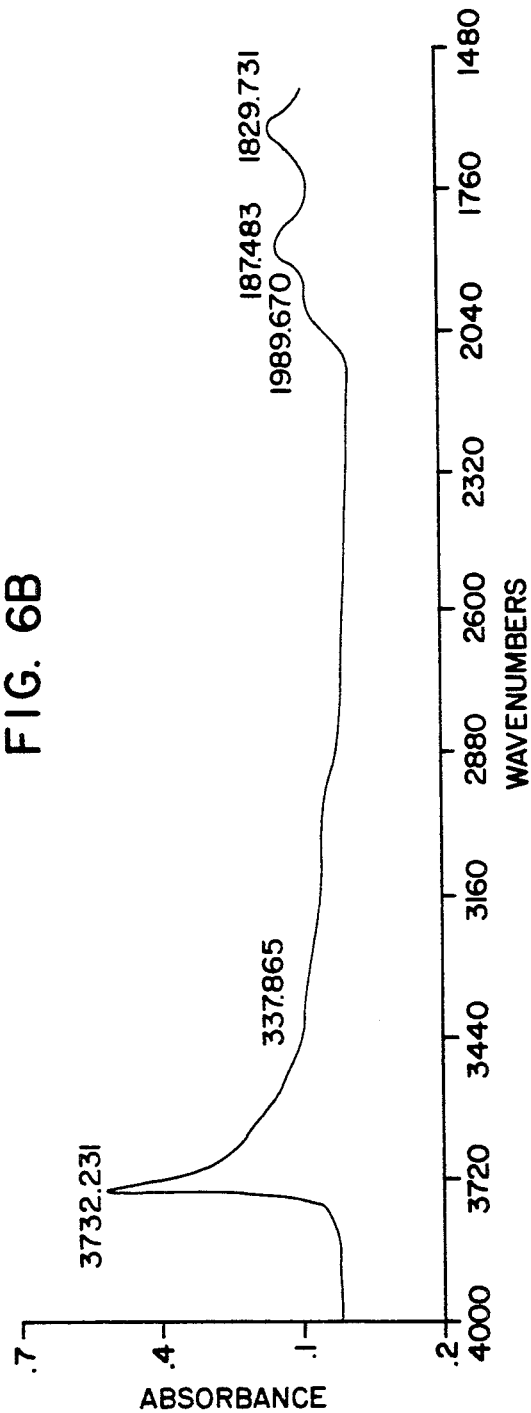
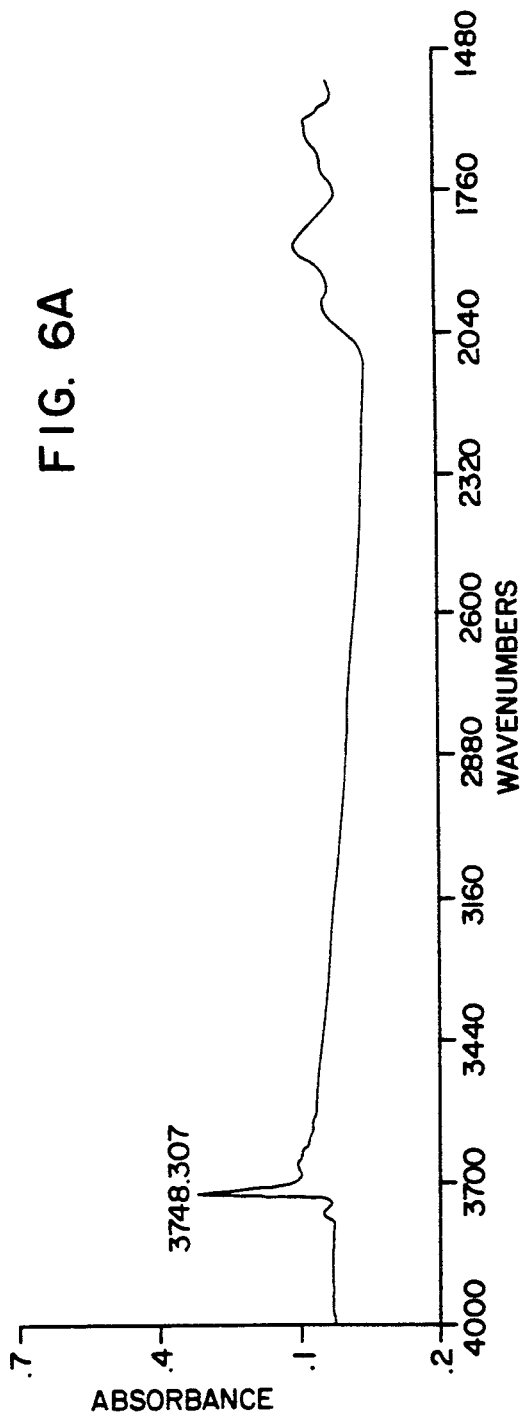

PREPARATION OF HYDROXYL-RICH ZEOLITES

This is a continuation of copending application Ser. No. 789,267, filed on Oct. 18, 1985 and now abandoned.

FIELD OF THE INVENTION

The invention is directed to new hydroxyl-rich zeolites. The hydroxyl-rich zeolites are prepared by ammonia treatment of sieves which have suffered a loss of tetrahedral aluminum followed by an elevated temperature treatment of a maximum temperature of about 450° C. The hydroxyl groups created by this method are stable only to 500° C.

BACKGROUND OF THE INVENTION

Naturally occurring and synthetic zeolites have been demonstrated to exhibit catalytic properties for various types of hydrocarbon conversions. Certain zeolites are ordered porous crystalline aluminosilicates having definite crystalline structure as determined by X-ray diffraction studies. Such zeolites have pores of uniform size which are uniquely determined by unit structure of the crystal. The zeolites are referred to as "molecular sieves" because interconnecting channel systems created by pores of uniform pore size allow a zeolite to selectively absorb molecules of certain dimensions and shapes.

By way of background, one authority has described the zeolites structurally, as "framework" aluminosilicates which are based on an infinitely extending three-dimensional network of $AlO_4$ and $SiO_4$ tetrahedra linked to each other by sharing all of the oxygen atoms. Furthermore, the same authority indicates that zeolites may be represented by the empirical formula

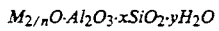

$$M_{2/n}O \cdot Al_2O_3 \cdot xSiO_2 \cdot yH_2O$$

In the empirical formula, x is equal to or greater than 2, since $AlO_4$ tetrahedra are joined only to $SiO_4$ tetrahedra, and n is the valence of the cation designated M. D. Breck, ZEOLITE MOLECULAR SIEVES, John Wiley & Sons, New York p.5 (1974). In the empirical formula, the ratio of the total of silicon and aluminum atoms to oxygen atoms is 1:2. M was described therein to be sodium, potassium, magnesium, calcium, strontium and/or barium, which complete the electrovalence makeup of the empirical formula.

The crystal lattice framework of these aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing alumina is balanced by the inclusion in the crystal of a cation, for example an alkali metal, an alkaline earth metal or an organic cation. This can be expressed wherein the ratio of aluminum to the number of various cations, such as Ca/2, Sr/2, Na, K or Li, is equal to unity. One type of cation may be exchanged entirely or partially with another type of cation utilizing ion exchange techniques in a conventional manner. By means of such cation exchange, it has been possible to vary the properties of a given aluminosilicate by suitable selection of the cation. The cavities and pores are occupied by molecules of water prior to dehydration and/or possibly by organic species from the synthesis mixture in the as-synthesized materials.

The prior art describes a variety of synthetic zeolites. These zeolites have come to be designated by letter or other convenient symbols, as illustrated by zeolite A (U.S. Pat. No. 2,882,243); zeolite beta (U.S. Pat. No. 3,308,069 and Re 28341); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No., 3,314,752); zeolite ZSM-5 (U.S. Pat. No., 3,702,886); zeolite ZSM-11 (U.S. Pat. No. 3,709,979) and zeolite ZSM-23 (U.S. Pat. No. 4,076,842), merely to name a few.

The silicon/aluminum atomic ratio of a given zeolite is often variable. For example, zeolite X can be synthesized with silicon/aluminum atomic ratios of from 1 to 1.5, while that ratio in zeolite Y is from 1.5 to 3. In some zeolites, the upper limit of the silicon/aluminum atomic ratio is unbounded. ZSM-5 is one such example wherein the silicon/aluminum atomic ratio is at least 2.5 and up to infinity. U.S. Pat. No. 3,941,871, reissued as RE. 29,948, discloses a porous crystalline silicate made from a reaction mixture containing no deliberately added aluminum and exhibiting the X-ray diffraction pattern characteristic of ZSM-5 zeolites.

Moreover, the silicon/aluminum atomic ratio of the "as-synthesized" zeolite can be altered, specifically increased, by decreasing the tetrahedral alumina thereof. Decrease in the tetrahedral alumina may be effected by synthetic methods developed to deplete the tetrahedral alumina of a zeolite. In addition, the silicon:aluminum atomic ratio of a zeolite may be increased, that is there may be a loss of tetrahedral alumina, as a result of process conditions to which the zeolite may be subjected during use. Process conditions which will effect depletion of tetrahedral alumina include high temperature calcination and steaming. This loss of aluminum does not affect the crystallinity of zeolites, such as ZSM-5.

Those zeolites of practical significance today are not only characterized by uniform pore sizes, but also by channel systems created by those pores. To maintain activity of a zeolite, the crystallographic structure of the zeolite after chemical treatment must remain in tact.

Various chemical treatments of zeolites have been proposed to modify their chemical properties. In accordance with the invention, the chemical treatment described introduces additional hydroxy groups to the zeolite. In J. Datka et al "Hydroxyl groups and acid sites in Na-ZSM-5 zeolites studied by i.r. spectroscopy" Zeolites Vol. 5 No. 4, p. 230 (July 1985), non-acidic hydroxyl group presence in Na-ZSM-5 was attributed to the i.r. band at about 3738 cm$^{-1}$; in addition, J. Datka et al referred to the i.r. work of Jacobs and Ballmoos who assigned OH groups vibrating at about 3720–3730 cm$^{-1}$, to extra zeolitic material which might be introduced into Na-ZSM-5 during synthesis or during the decomposition of organic entities in Na-ZSM-5.

SUMMARY OF THE INVENTION

In accordance with the invention, zeolites enriched with hydroxyl groups are readily prepared by ammonia treatment of sieves which have suffered loss of tetrahedral aluminum from framework positions followed by careful calcination at 200°–450° C. For example, creation of novel hydroxyl sites in ZSM-5 is evident from the appearance of a new stretching band near 3720 cm$^1$ in the FTIR spectrum. The new ir band is not present in the zeolite prior to this treatment. Zeolite beta similarly shows a significantly increased absorbance of the existing 3745 cm$^{-1}$ stretching band. Here, the new hydroxyls are indistinguishable from the terminal silanols, and only an increased concentration may be deduced. The preparation has been demonstrated for both steam and high temperature calcined zeolites (with and without supported metals).

DESCRIPTION OF THE DRAWINGS

FIG. 1 is a Fourier Transform Infrared (FTIR) spectrum of dehydroxylated ZSM-5 (1000° C., 1 hr) prior to ammonia sorption (Example1).

FIG. 2 is a FTIR spectrum of dehydroxylated ZSM-5, (1000° C., 1 hr) following ammonia desorption (Example 1).

FIG. 6 is a FTIR spectrum of dehydroxylated zeolite beta before and FIG. 6B is a trace of a FTIR spectrum after ammonia treatment (Example 3).

FIG. 9 is an Ammonia desorption derivative plot and FIG. 9B is a weight loss derivative plot for Pt on steamed zeolite beta (Example 5).

DESCRIPTION OF THE INVENTION

Figures 3A, 3B:
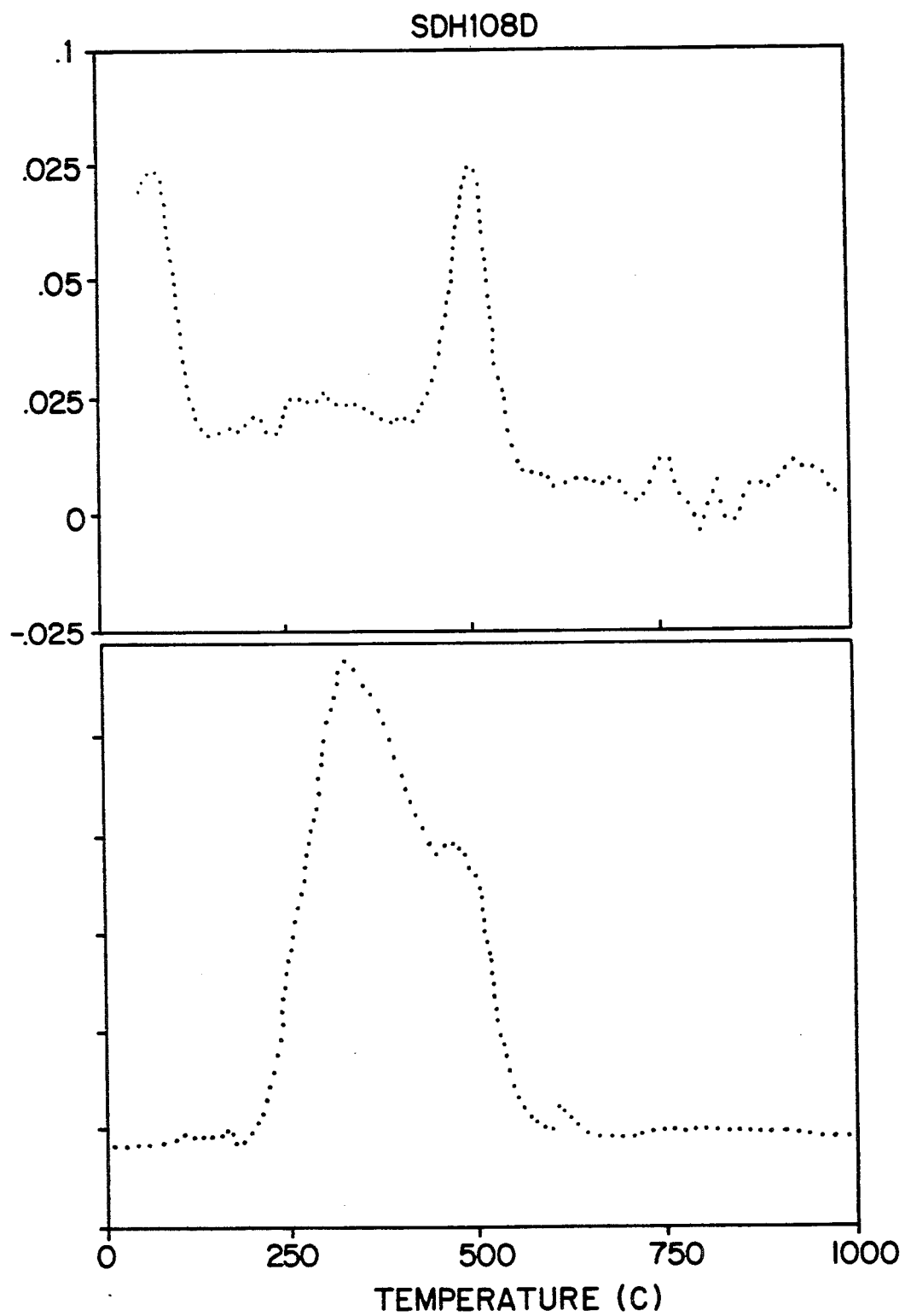
FIG. 3A is weight loss derivative plot for dehydroxylated ZSM-5 (1000° C., 1 hr)
FIG. 3B, is an Ammonia desorption plot. (Example 1).

The reactant zeolites used in accordance with the invention have suffered a loss of tetrahedral alumina, or, in other words, will have been partially or completely dealuminized. Prior to such aluminum loss, the zeolite will be in the acid form. The acid form of the zeolite, having SiO$_2$:Al$_2$O$_3$ mole ratio of less than about 500:1 will show absorbance in the i.r. at 3610 cm$^{-1}$. With decreasing SiO$_2$:Al$_2$O$_3$ ratios that absorbance at 3610 cm$^{-1}$ will increase. Such loss may be effected, for example, by high temperature (about 1000° C.) calcination. The Fourier Transform Infrared Spectrograph of said reactant zeolites exhibit no absorbance at 3610 cm$^{-1}$; that is, the FTIR spectrograph of said reactants shows complete loss of the bridging hydroxyl stretching band at about 3610 cm$^{-1}$ associated with the Bronsted acid sites of zeolites. The FTIR spectrograph of the zeolite reactants also exhibits absorbance at about 3745 cm$^{-1}$ which is the characteristic stretching band of terminal silanols in the zeolites.

A class of zeolites which may be used in accordance with the invention includes those which exhibit a constraint index of about 1 to about 12 over the temperature range of 550° F. to 950° F. The "constraint index" is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. It is to be realized that the above constraint index values typically characterize the specified zeolites but that these are the cumulative result of several variables used in determination and calculation thereof. Thus, for a given zeolite depending on the temperature employed within the aforenoted range of 550° F. to 950° F., with accompanying conversion 10% and 60%, the constraint index may vary within the indicated approximate range of 1 to 12. Likewise, other variables, such as the crystal size of the zeolite, the of possible occluded contaminants and binders intimate with the zeolite may affect the constraint index. It accordingly be understood by those skilled in the art that the constraint index, as utilized herein, while affording a highly useful means for characterizing the zeolites of in is an approximation, taking into consideration the of its determination, with probability, in some of compounding variable extremes.

While the above experimental pro will enable one to achieve the desired overall conversion of to 60% for most catalyst samples and represents preferred , it may occasionally be necessary to use somewhat mo severe conditions for samples of very low activity, such as those having a very high silica to alumina mole ratio. In those instances, a temperature of up to about 1000° F. and a liquid hourly space velocity of less than one, such as 0.1 or less, can be employed in order to achieve a minimum total conversion of about 10%.

The zeolites, ZSM-5 and zeolite beta, which had suffered loss of tetrahedral alumina were the subject of experiments reported in the Examples below. The zeolite ZSM-5 and zeolite beta, their preparation and their respective characteristic X-ray diffraction patterns are known. Zeolite beta, its preparation and its characteristic X-ray diffraction pattern are described in U.S. Pat. No. 3,308,069 and Re. 28,341, each of which is incorporated by reference herein. The zeolite ZSM-5, its preparation and its characteristic X-ray diffraction pattern are described in U.S. Pat. No. 3,702,886 and Re 29,948, each of which is incorporated by reference herein.

In accordance with the invention, the zeolite which exhibits a loss of tetrahedral aluminum is subjected to ammoniation. This ammoniation may be conducted by contacting the reactant zeolite with gaseous ammonia. An alternative method is to provide aqueous solutions of ammonium salts, including NH$_4$OAc, NH$_4$Cl, NH$_4$NO$_3$, and the like, or of ammonium hydroxide and contacting that reactant zeolite with said aqueous solutions containing a source of ammonium; conventionally, the normality of these solutions can be 0.1N to 1N in ammonium salts (although solution of higher normality may be employed) and contact times may range from about 1 to 24 hours, at ambient and elevated temperatures, optionally undertaken in a multi-stage ammonium ion exchange. However, in the experiments reported below, it was preferred to use gaseous ammonia to eliminate the possibility of a number of exchange reactions. Contact times with gaseous ammonia can range from less than one hour to 48 hours. The ammonia gas treatments reported below were undertaken in the presence of atmospheric humidity and thus were not undertaken under anhydrous conditions.

The ammonium-exchanged zeolite reactant is subjected to a controlled elevated temperature treatment. The maximum temperature of the range of temperatures, over which this heat treatment is conducted, should not exceed a temperature of about 450° C. measured at atmospheric pressure. Practically the temperature range of the elevated temperature treatment will range from 200° C. to 450° C. measured at atmospheric pressure.

During this elevated temperature treatment in accordance with the invention $NH_3$ will be desorbed. The other novel result of this temperature treatment in accordance with the invention is the production of hydroxyl-rich zeolites. The hydroxylated zeolites of the invention have been corroborated by FTIR and thermogravimetric analysis, as reported in detail in the Examples and in the drawings. Creation of novel hydroxyl sites in ZSM-5 is evident from the appearance of a new stretching band near 372 $cm^{-1}$ in the ftir spectrum. The new ir band is not present in the zeolite prior to this treatment. Zeolite beta similarly shows a significantly increased absorbance of the existing 3745 $cm^{-1}$ stretching band. Here, the new hydroxyls are indistinguishable from the terminal silanols, and only an increased concentration may be deduced. The preparation has been demonstrated for both steam and high temperature calcined zeolites (with and without supported metals). The hydroxyl groups created by this procedure are stable only to 500° C., and are unique from any hydroxyls previously existing in the zeolite sample. The uniqueness of these hydroxyls is apparent from both their distinct FTIR absorbance in ZSM-5 at 3720 $cm^{-1}$, and from the rapid, dehydration observed by both FTIR and tga. Neither are observed in the original sample, before or after dealumination of the framework. In addition to their formation, the hydroxyls are destroyed by reagents known to react with this type of functionality (e.g. $SiCl_4$ and $AlCl_3$).

The criticality of the upper limit of the temperature treatment is reflected by the fact that the newly created hydroxyl groups are destroyed, with water loss, if the hydroxylated zeolite is heated to 500° C. When ammonia is expelled below 450°-500° C., a unique, sharp, stretching band remains near 3720 $cm^{-1}$ in the FTIR spectrum. This band is associated with a novel hydroxyl moiety, and has not been reported previously to our knowledge. Heating to near 500° C. causes a complete and rapid loss of these new hydroxyl groups. The rapid expulsion of water is also observed as a major weight loss ($T_{max}$) during tga. It is clear, therefore, that a unique zeolitic material is produced under the restricted conditions described herein. These novel hydroxyl-rich zeolitic materials are significant for several reasons. New silanols may be formed due to rehydration of strained siloxane bridges formed during framework dealumination. Alternatively, they may represent the hydration of extra-lattice aluminum. The former rationale appears more consistent with the observed FTIR absorbance near 3720 $cm^{-1}$, which is very near to other reported silanol stretching frequencies. Indeed, with zeolite beta the new absorbance actually overlaps with existing terminal silanols. Substitution of these hydroxyls, therefore, could render framework dealuminated zeolites more like that of as-synthesized materials, i.e. fewer defects. Parenthetically substitution of these hydroxyl can be undertaken as previously indicated by reaction of the hydroxyls of the hydroxyl-rich zeolite with $SiCl_4$ and $AlCl_3$.

In addition, the hydroxyl groups of inorganic matrices are generally believed to initiate crystallite growth of supported metals. That is, zeolites prior to use may be impregnated, ion exchanged or admixed with metal or metal derivates, the metal being a promoter or accelerator, for the hydrocarbon conversion in which the zeolite will be used; by way of example, reference is made to platinum impregnated, ion-exchanged or dispersed zeolites, in which the platinum is, e.g., a hydrogenation-dehydrogenation component. (Agglomertion of platinum on zeolites, after use in hydrocarbon conversion processed is known. Since steamed or thermolyzed zeolites are important candidates for metal supports, controlling the concentration of these new hydroxyls could have a major impact on dispersion and redispersion properties.

It is readily apparent that these hydroxyl-rich zeolites may be employed in hydrocarbon conversions, described in the prior art to which the zeolites are particularly applicable. These new compositions are particularly useful in acid-catalyzed low temperature conversions of methanol to gasoline, of isomerization, e.g., of xylene containing feeds, of alkylation and disproportionation of aromatics and of olefin oligomerization, conducted at temperatures of ambient to 450° C., at pressures from subatmospheric to several hundred atmospheres, a liquid hourly space velocity between 0.1 and 10, and a hydrogen to hydrocarbon (feed) mole ratio of 0 to 20.

The following examples are illustrative of the invention.

EXAMPLES

EXAMPLE 1

ZSM-5 ($SiO_2/Al_2O_3=70$) was calcined at high temperature (1000° C., 60 min) in an atmosphere of nitrogen. The FTIR spectra were run at ambient temperature (about 25° C.). The FTIR spectrum of the sample showed complete loss of the bridging hydroxyl stretching band (3610 $cm^{-1}$) associated with the Bronsted acid sites of zeolites (FIG. 1). Only the terminal silanol stretching band (3745 $cm^{-1}$) remained. The calcined sample was then treated with gaseous ammonia at ambient room temperature in the presence of atmospheric humidity. The resulting ammoniated zeolite (approx. 0.10 meq NH3/gm of ash) was desorbed in vacuo (400° C., $10^{-5}$ torr) prior to spectral analysis. The FTIR spectrum (FIG. 2) now showed an entirely new hydroxyl stretching band near 3720 $cm^{-1}$. Increasing the sample temperature to 500° C. caused the rapid disappearance of the new band. Tpad anal (FIG. 3) showed a major weight loss ($T_{max}=500°$ C.) at a temperature well above that for ammonia desorption ($T_{max}=290°$ C.), corresponding to dehydration.

EXAMPLE 2

Figure 4:
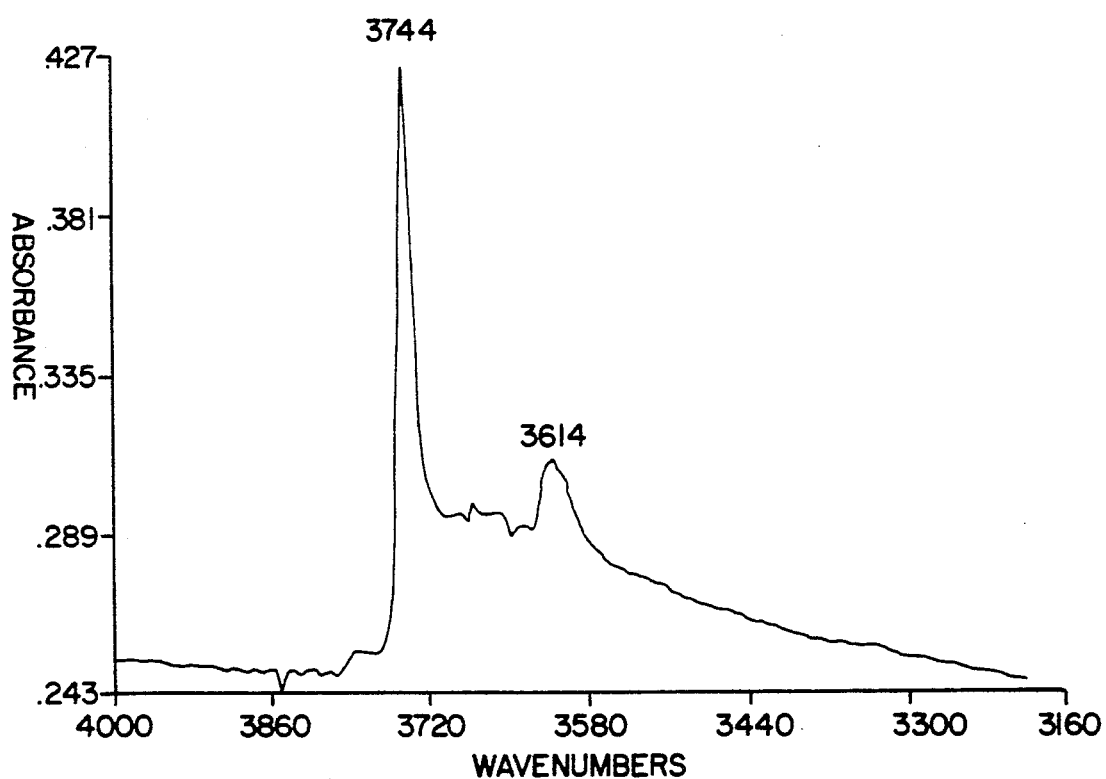
FIG. 4 is a FTIR spectrum of steamed ZSM-5 (538° C., 6 h) prior to ammonia treatment (Example 2).
Figure 5:
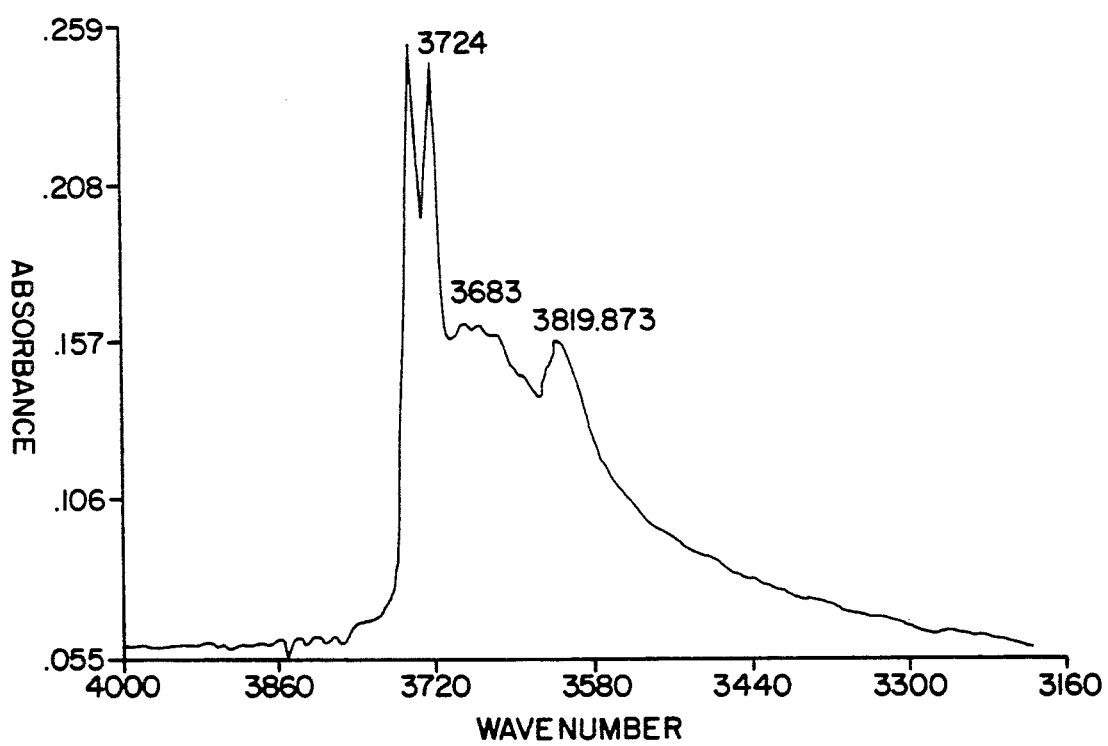
FIG. 5 is a FTIR spectrum of steamed ZSM-5 (538° C., 6 h) following ammonia desorption (Example 2).

A sample of ZSM-5 was steam calcined (538° C., 1 atm of steam, 6 hr), and showed a decreased bridging hydroxyl stretch (3610 $cm^{-1}$) in the FTIR spectrum (FIG. 4). Ammoniation and calcination (as above) again provided a material with new hydroxyl groups absorbing near 3720 $cm^{-1}$ (FIG. 5). The thermal stability and tpad profile of this sample was consistent with that of Example 1.

EXAMPLE 3

A sample of zeolite beta ($SiO_2/Al_2O_3$=about 40) was calcined at high temperature under a nitrogen atmosphere (850° C., 0.5h). Treatment with ammonia gas and desorption (as above) provided a sample with an enhanced absorbance band at 3745 cm$^{-1}$ (FIG. 6). Though indistinguishable from the existing terminal silanol stretching frequency, increased concentration of hydroxyl groups in the sample may be deduced from increased absorbance by the Beers-Lambert Law.

EXAMPLE 4

Figures 7A, 7B:
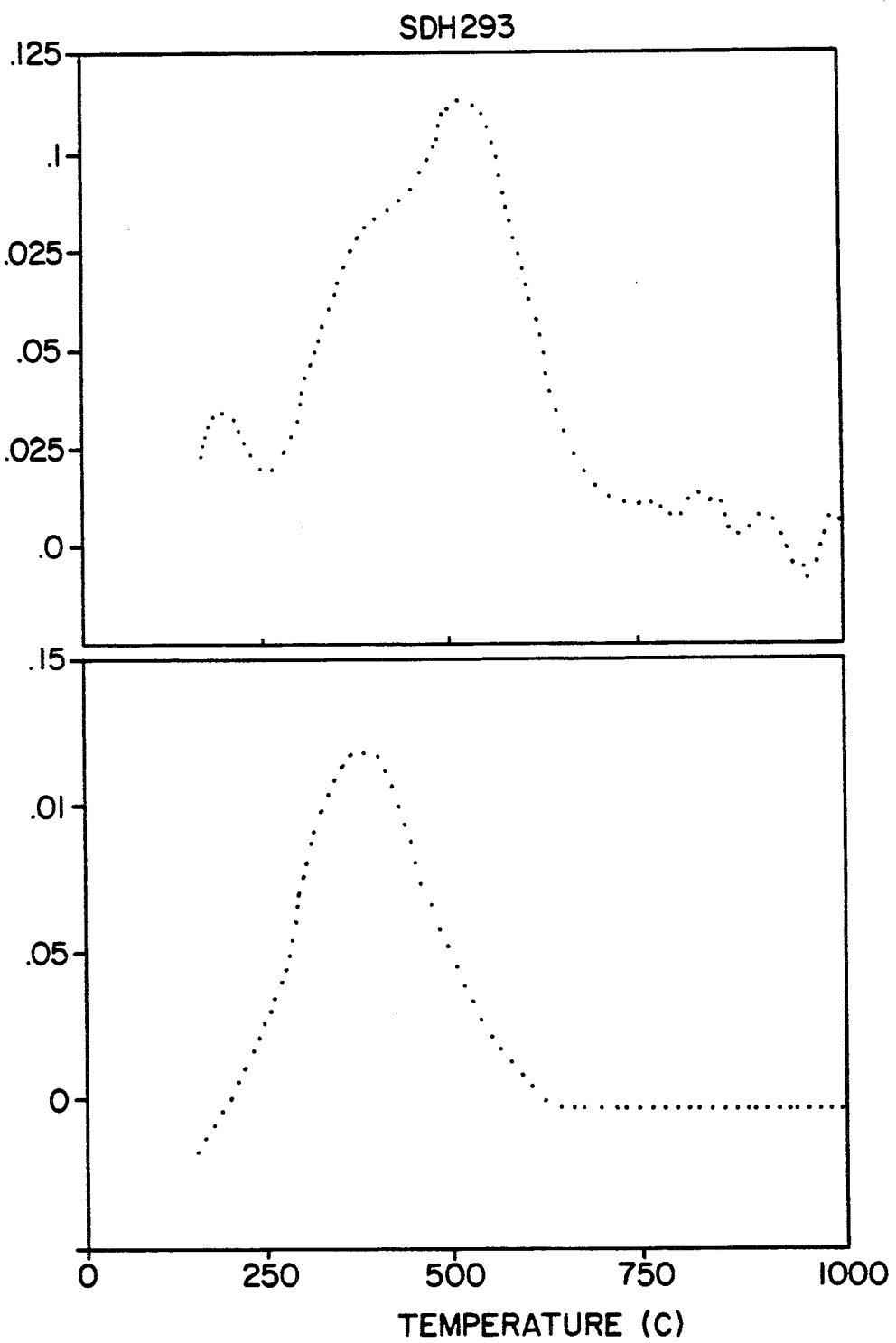
FIG. 7A is an Ammonia desorption derivative plot and FIG. 7B is a weight loss derivative plot for steamed zeolite beta (500° C., 16 h) (Example 4).

A sample of zeolite beta which had been steam calcined (500° C., 1 atm of steam, 16 hr) was ammoniated and desorbed as above. Tpad data (FIG. 7) again showed an increased hydroxyl group concentration due to this sample preparation. The hydroxyl-rich material, as before, underwent rapid dehydration when heated to 500° C.

EXAMPLE 5

Figure 8:
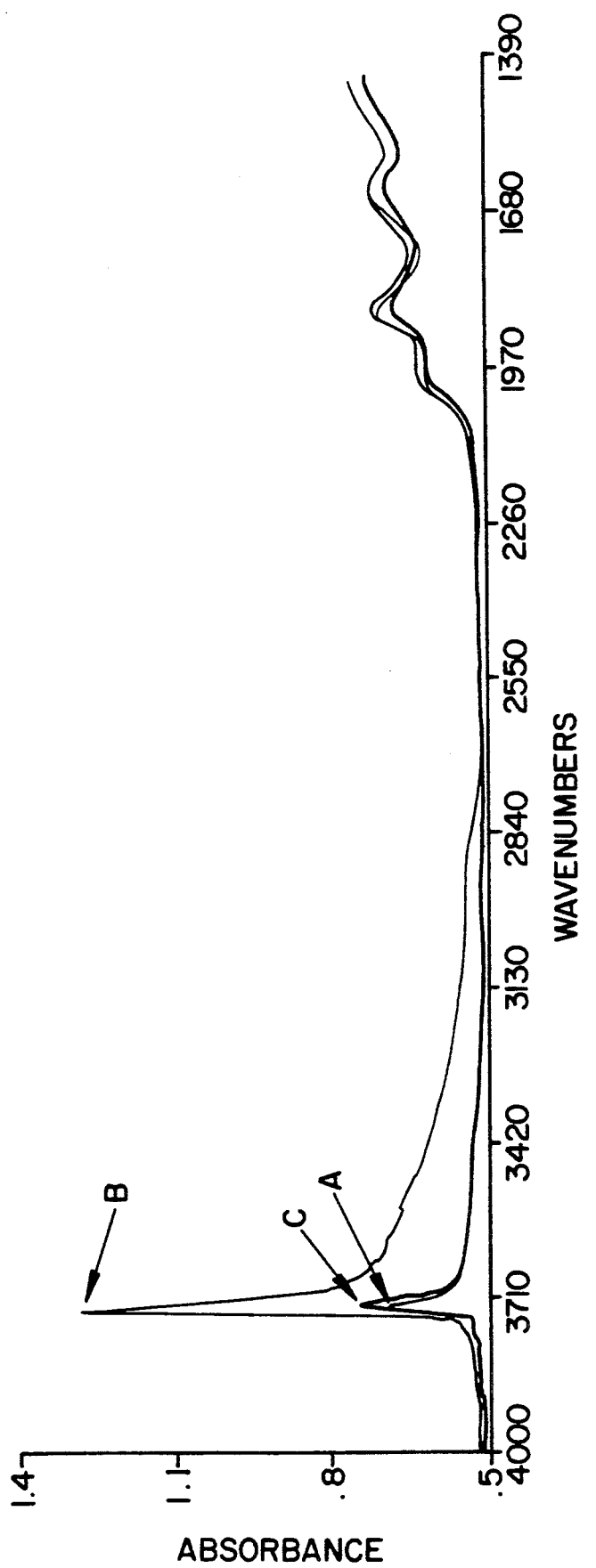
FIG. 8 constitutes the FTIR spectra of Pt on steamed zeolite beta (example 5), in which curve A is of the ammoniated steamed zeolite beta containing Pt; curve B the spectrum of that sample of A after ammonia desorption 400° C.; and curve C is the spectrum of the sample exhibiting curve B after its dehydration at 500° C.
Figures 9A, 9B:
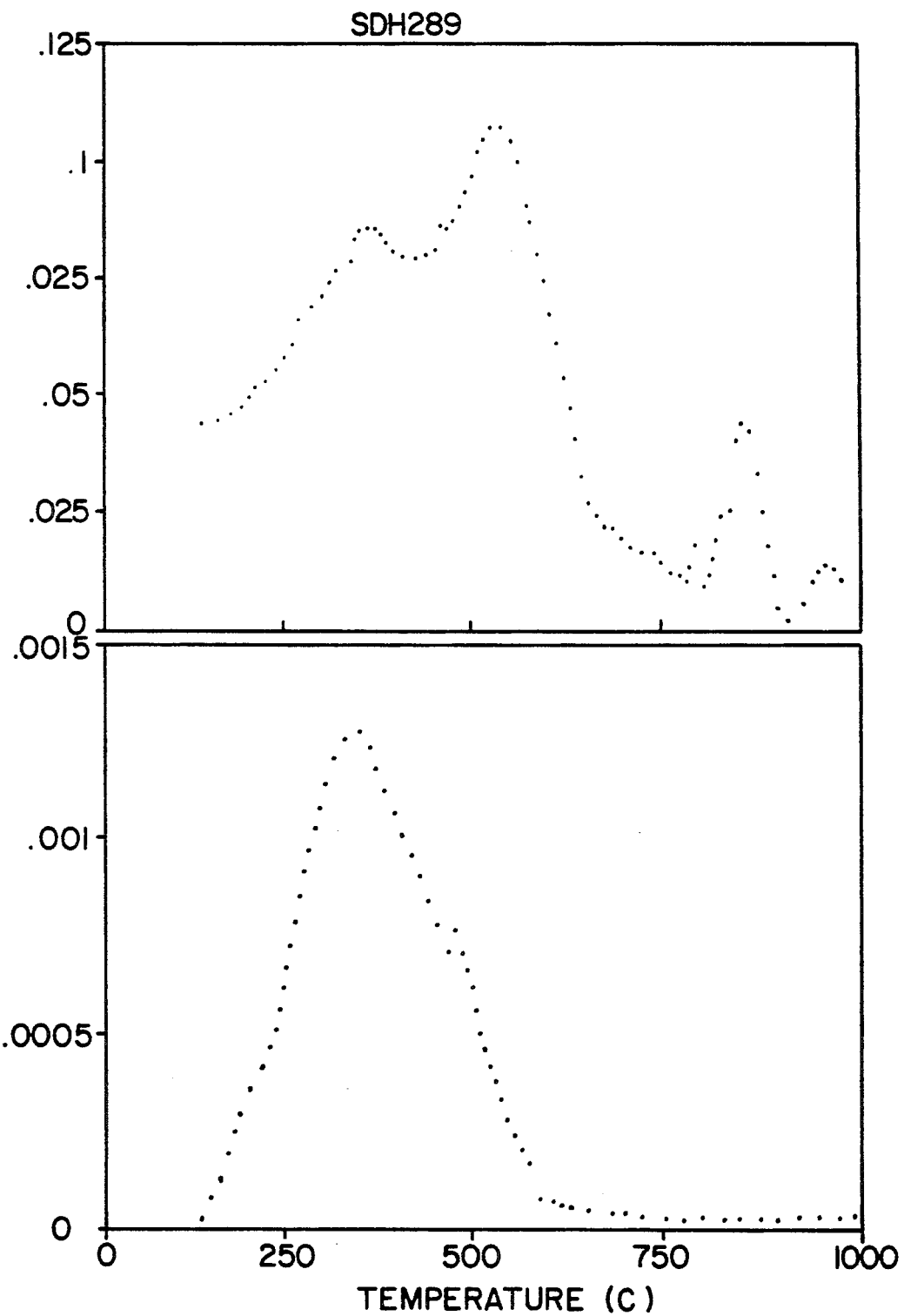

A sample of platinum on steamed zeolite beta (500° C., 1 atm of steam, 16 hr), which had been calcined to 500° C. during $H_2$ sorption studies, was treated with ammonia gas as described above. FTIR spectra following desorption at 400° C. (10$^{-5}$torr) showed an increase in the 3745 cm$^{-1}$ hydroxyl band (FIG. 8). The enhanced absorbance intensity diminished rapidly when the temperature was raised to 500° C. The tpad profiles (FIG. 9) showed weight losses at Tmax=290° C. (corresponding to ammonia desorption), Tmax=500° C. (corresponding to dehydration of the hydroxyls observed by FTIR), and Tmax=850° C. The latter weight loss of a non-basic substance, presumably water, is apparently due to the presence of platinum, since it was not observed with the pure zeolite.

EXAMPLE 6

The thermally treated ZSM-5 sample of example 1 was exchanged with aqueous ammonium nitrate (1M) at room temperature (1 hr). FTIR spectral analysis and TPAD data were identical to those described for example 1.

EXAMPLE 7

Figure 10A:
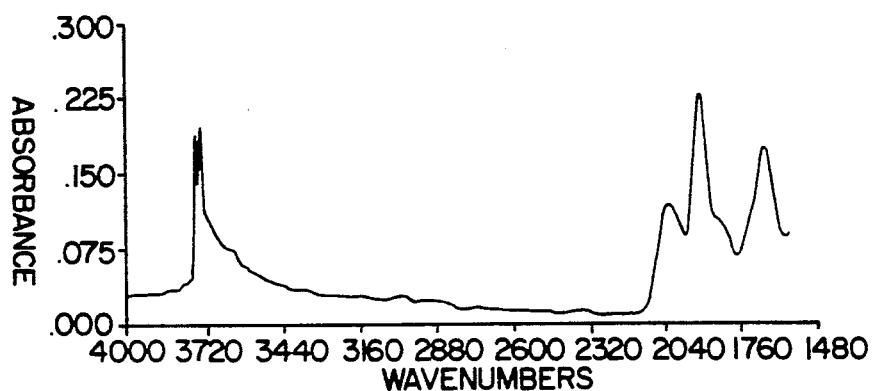
FIG. 10A is FTIR spectra of hydroxyl-rich ZSM-5 after ammonia desorption without SiCl$_4$ treatment.
Figure 10B:
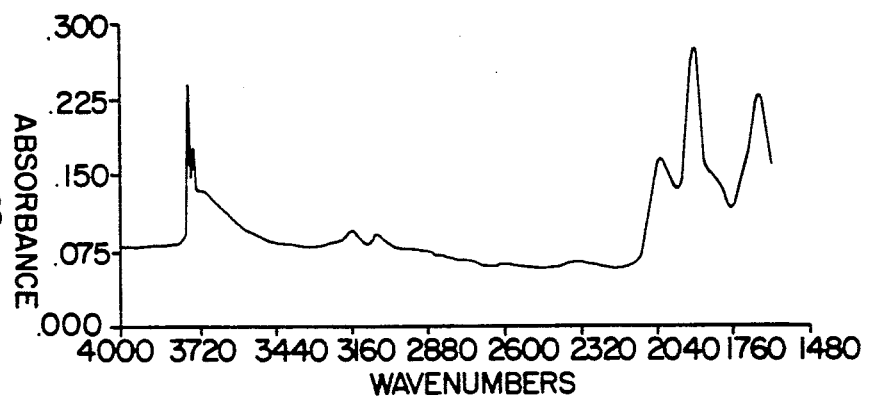
FIG. 10B is the FTIR spectrum of the sample used in FIG. 10 A and treated with SiCl$_4$ (100° C.)
Figure 10C:
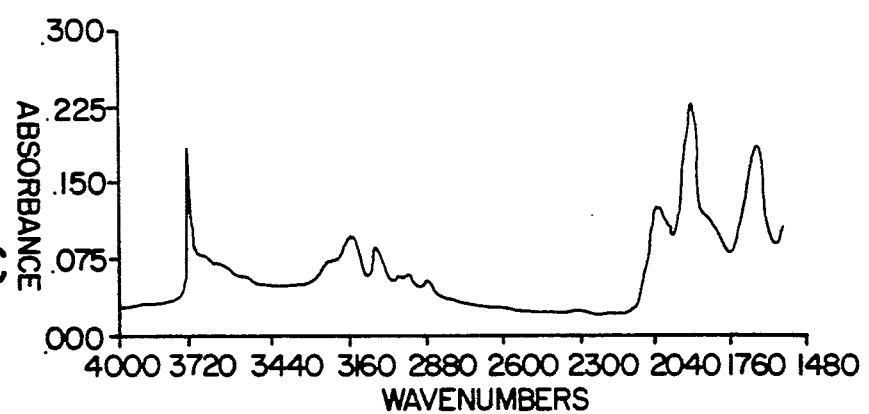
FIG. 10C is the FTIR spectrum of the sample of FIG. 10A and treated with SiCl$_4$ (200° C.) (Example 7).

Thermally dehydroxylated ZSM-5 (example 1) was treated with ammonia gas, then desorbed at 400° C. (1 hr) under a stream of dry argon. The hydroxyl-rich sample was then treated with tetrachlorosilane carried in argon (100° C., 1–1.25 hr). Excess silane was removed by flushing with argon overnight. The silylated material was again treated with ammonia to regenerate any remaining hydroxyls. The identical procedure was followed with another sample, but the silylation temperature was increased to 200° C. Analysis of FTIR spectra of these samples (FIG. 10) revealed that destruction of these new hydroxyls had resulted from the silane treatment. Furthermore, the extent to which hydroxyl concentration is reduced increases with temperature.

EXAMPLE 8

Figure 11A:
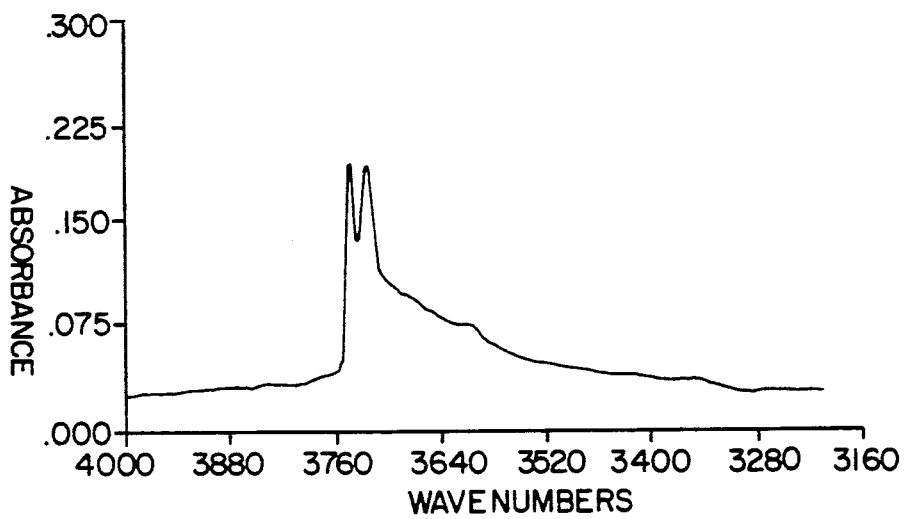
FIG. 11A is a FTIR spectra of hydroxyl-rich ZSM-5 after ammonia desorption without AlCl$_3$ treatment and FIG. 11B is the curve of the hydroxyl-rich ZSM-5 with AlCl$_3$ treatment (Example 8).
Figure 11B:
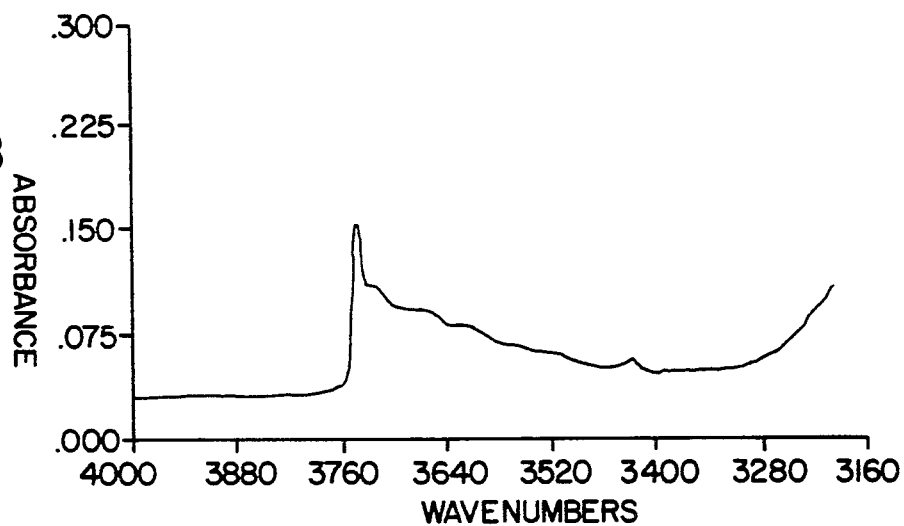

Thermally treated ZSM-5 (as in example 1) was treated with ammonia gas, then desorbed in a stream of dry argon (400° C., 1 hr). The hydroxyl-rich sample was subjected to the vapors of aluminum trichloride (1 gm/gm of zeolite) in an argon carrier gas (400° C., 3 passes, 0.5 hr each). Excess aluminum chloride was expelled by raising the reactor temperature (500° C., 1 hr). The sample was again ammoniated to regenerate any remaining hydroxyl groups. FTIR spectral analysis following ammonia desorption (400° C., 10$^{-5}$ torr) (FIG. 11) revealed that the treatment had substantially decreased the concentration of the new hydroxyl groups.

What is claimed is:

1. A method of preparing hydroxyl-rich zeolites comprising providing as a reactant, a zeolite, which has suffered a loss of tetrahedral aluminum, and has been subjected to an elevated temperature of at least 500° C., and then subjecting the reactant zeolite to ammoniation; subjecting the ammoniated zeolite to conditions equivalent to second elevated temperature which ranges up to 450° C. whereby ammonia is evolved and the zeolite contains hydroxyl groups absent from the reactant zeolite.

2. The method of claim 1, wherein ammoniation is conducted by treating the reactant zeolite with ammonia or with an aqueous solution containing a source of ammonia or ammonium ion.

3. The method of claim 1, wherein the Fourier Transform Infrared Spectrograph of the elevated temperature treated ammoniated zeolite differs from the Fourier Transform Infrared Spectrograph of the reactant zeolite.

4. The method of claim 1, which further includes the step of contacting said elevated temperature treated ammoniated reactant with $SiCl_4$ or $AlCl_3$.

5. The method or claim 1 wherein said conditions include an elevated temperature, at atmospheric pressure, ranging from about 200° C. to about 450° C.

6. The method of claim 1, wherein said reactant zeolite is characterized by a constraint index within the approximate range of about 1 to about 12, measured at 500° F. to 950° F.

7. The method of claim 1 wherein said zeolite is ZSM-5 or zeolite beta.

8. The method of claim 1 wherein said zeolite is ZSM-5.

9. The method of claim 1, wherein said zeolite is zeolite beta.

10. The product produced by the method of claim 1.
11. The product produced by the method of claim 6.
12. The product produced by the method of claim 7.
13. The product produced by the method of claim 8.
14. The product produced by the method of claim 9.

15. A zeolite exhibiting the X-ray diffraction pattern of ZSM-5, having suffered loss of framework aluminum, the Fourier Transform Infrared Spectrograph of which exhibits absorbance at about 3720 cm$^{-1}$ and at about 3745 cm$^{-1}$.

16. A zeolite, having a characteristic X-ray diffraction pattern, exhibiting a constraint index within the approximate range of about 1 to about 12 measured at 500° F. to 950° F., having suffered loss of framework aluminum, the Fourier Transform infrared spectrogram of which exhibits absorbance at about 3720 cm$^{-1}$ and at about 3745 cm$^{31\ 1}$.

17. A zeolite, having a characteristic X-ray diffraction pattern; exhibiting a constraint index within the approximate range of about 1 to about 12, measured at 500° F. to 950°; having suffered loss of framework aluminum and the Fourier Transform Infrared Spectrograph of which exhibits hydroxylgroup absorbance, different from the absorbance either of the as-synthesized zeolite or of the as-synthesized zeolite subsequently heated to temperatures exceeding 500° C. and at about 3745 cm$^{-1}$.

18. A zeolite, exhibiting the X-ray diffraction pattern of zeolite Beta, having suffered loss of framework aluminum and the Fourier Transform Infrared Spectrograph of which exhibits hydroxyl group absorbance different from that of the zeolite as-synthesized and different from that of the as-synthesized zeolite calcined at temperatures greater than 500° C. and at about 3745 cm$^{-1}$.

19. The zeolite of claim 15, in the acid form.
20. The zeolite of claim 16, in the acid form.
21. The zeolite of claim 17, in the acid form.
22. The zeolite of claim 18, in the acid form.
23. The method of claim 1, wherein said second elevated temperature ranges up to about 400° C.
24. The method of claim 1, wherein ammoniation consists of subjecting the zeolite to ammonia gas.
25. The method of claim 23, wherein ammoniation consists of subjecting the zeolite to ammonia gas.
26. The method of claim 23, which further includes the step of contacting said elevated temperature treated ammoniated zeolite with SiCl$_4$ or AlCl$_3$.
27. The method of claim 24, which further includes the step of contacting said elevated temperature treated ammoniated zeolite with SiCl$_4$ or AlCl$_3$.
28. The method of claim 25, which further includes the step of contacting said elevated temperature treated ammoniated zeolite with SiCl$_4$ or AlCl$_3$.

* * * * *

UNITED STATES PATENT AND TRADEMARK OFFICE
CERTIFICATE OF CORRECTION

PATENT NO. : 5,143,876

DATED : September 1, 1992

INVENTOR(S) : Chang et al.

It is certified that error appears in the above-identified patent and that said Letters Patent is hereby corrected as shown below:

Column 8, line 16, after "450°C" insert -- (at atmospheric pressure) --

Column 8, line 60, "$cm^{31\ 1}$" should be -- $cm^{-1}$ --

Signed and Sealed this

Twenty-eighth Day of September, 1993

Attest:

BRUCE LEHMAN

Attesting Officer    Commissioner of Patents and Trademarks